J. C. WHITRIDGE.
CAR TRUCK.
APPLICATION FILED FEB. 3, 1920.
1,374,620.
Patented Apr. 12, 1921.
2 SHEETS—SHEET 1.
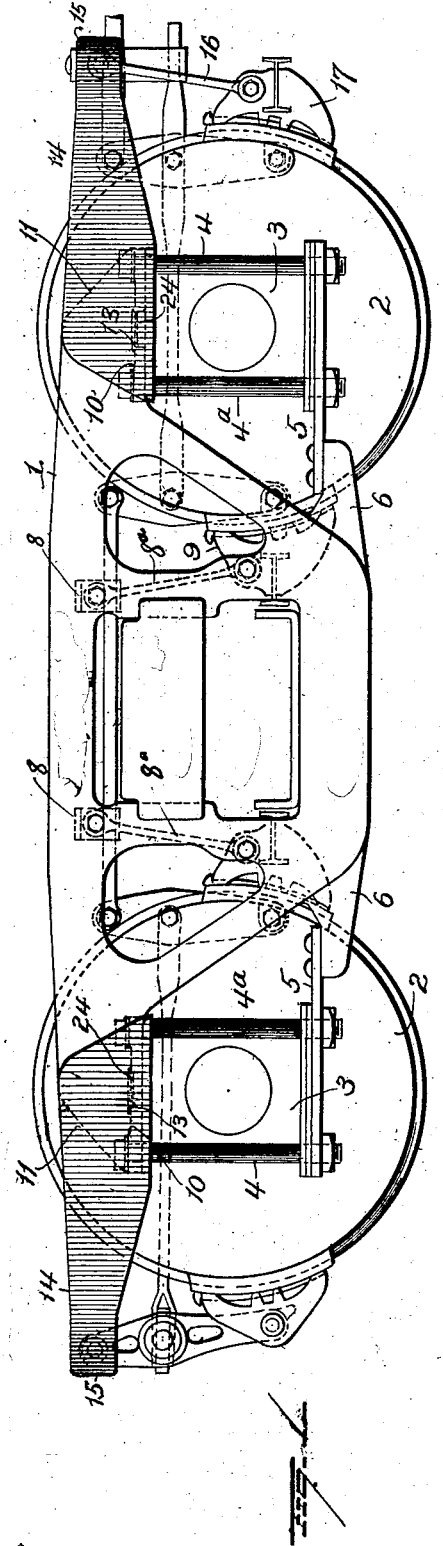
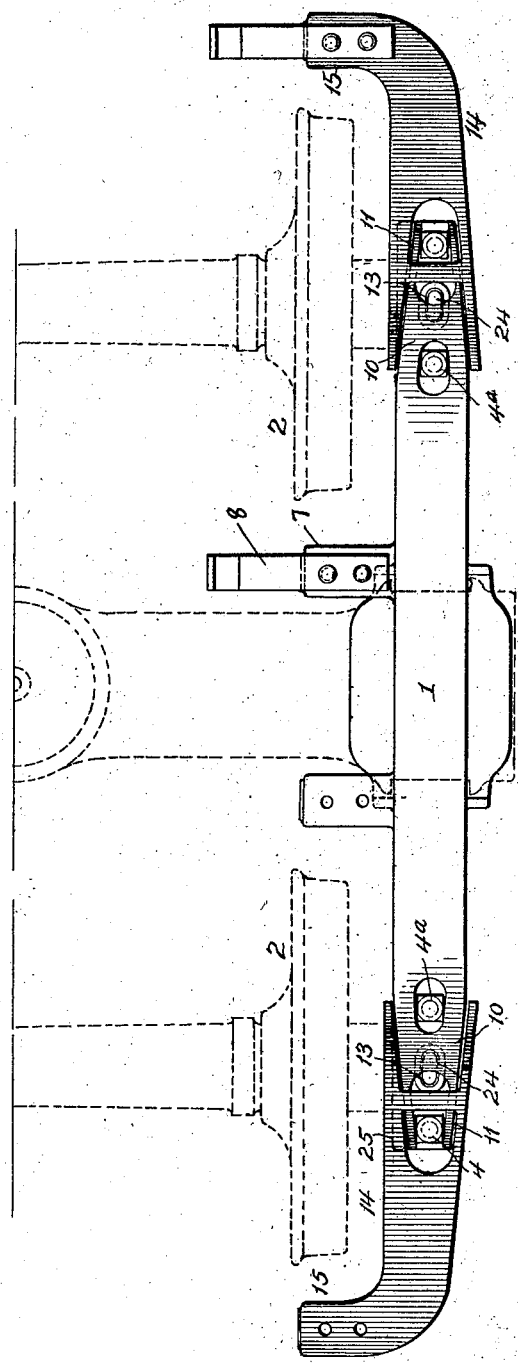
INVENTOR
J. C. Whitridge
By Seymour & Bright
Attorneys

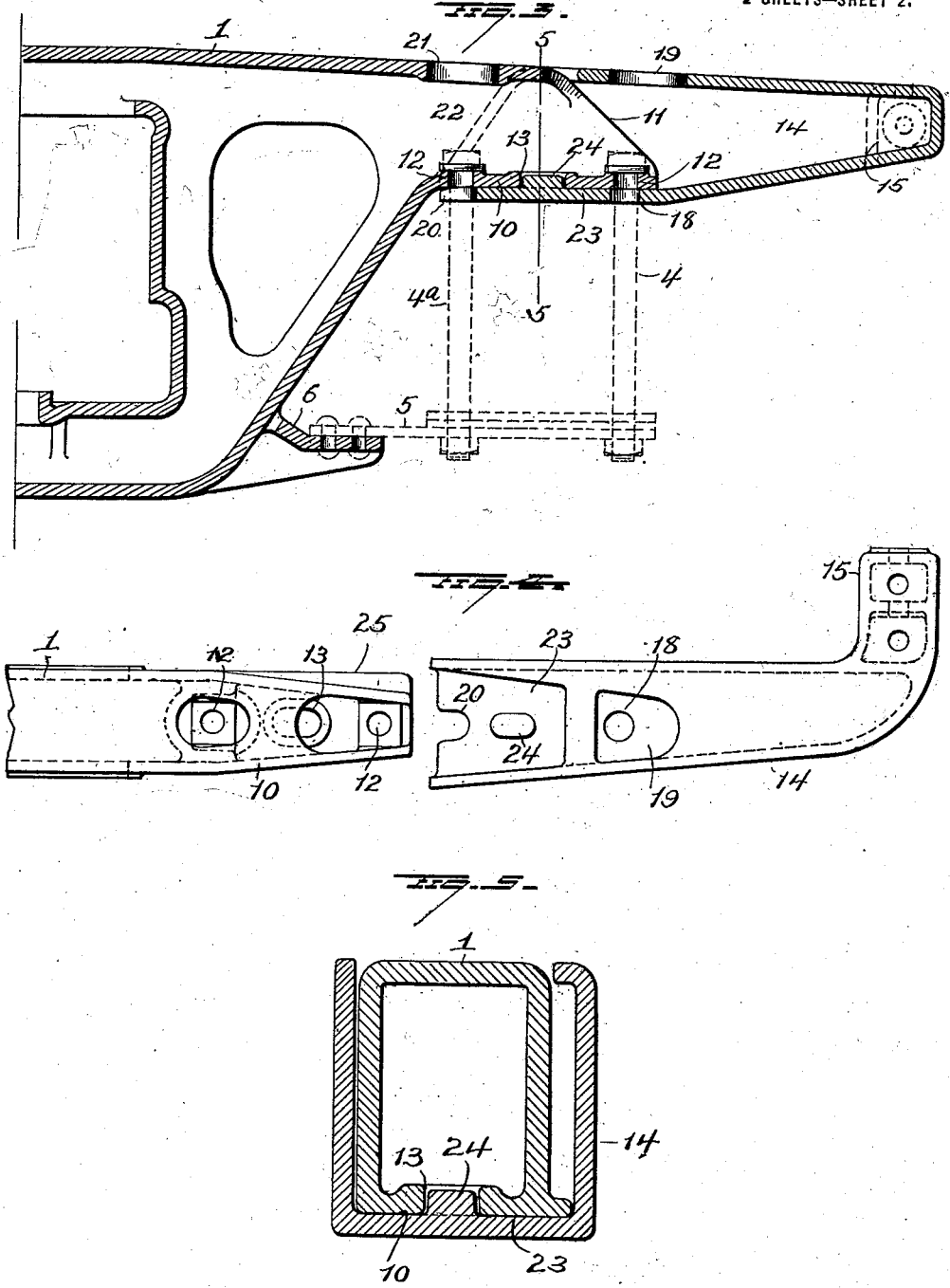

UNITED STATES PATENT OFFICE.

JOHN C. WHITRIDGE, OF COLUMBUS, OHIO, ASSIGNOR TO THE BUCKEYE STEEL CASTINGS COMPANY, OF COLUMBUS, OHIO.

CAR-TRUCK.

1,374,620.     Specification of Letters Patent.     Patented Apr. 12, 1921.

Application filed February 3, 1920. Serial No. 355,920.

*To all whom it may concern:*

Be it known that I, JOHN C. WHITRIDGE, a citizen of the United States, and a resident of Columbus, in the county of Franklin and State of Ohio, have invented certain new and useful Improvements in Car-Trucks; and I do hereby declare the following to be a full, clear, and exact description of the invention, such as will enable others skilled in the art to which it appertains to make and use the same.

This invention relates to improvements in car trucks and more particularly to that part of the structure which provides means for supporting the hangers for the outer brake shoes,—one object of the invention being to provide brackets for the outside brake-shoe hangers which shall be made separate from the side frames and secured thereto without the use of bolts or rivets other than the bolts which connect the journal boxes with the side frames.

A further object is to provide a structure wherein the brake shoe hanger brackets or castings shall be held in rigid relation relatively to the side frames, by the weight of the side frame load which is transmitted to the journal boxes; by the action of the journal box bolts; and by intermeshing connections between said brackets and the side frames.

With these and other objects in view, the invention consists in certain novel features of construction and combinations of parts as hereinafter set forth and pointed out in the claims.

In the accompanying drawings; Figure 1 is a side elevation of a truck showing an embodiment of my invention; Fig. 2 is a partial plan view; Fig. 3 is an enlarged sectional view showing a portion of a side frame and a brake hanger bracket secured thereto; Fig. 4 is a view showing one end of a side frame and brake hanger bracket separated therefrom, and Fig. 5 is a sectional view on the line 5—5 of Fig. 3.

1 represents a truck side frame, 2 the wheels, 3 the journal boxes, and 4, 4ᵃ the journal box bolts,—the latter being secured at their upper ends to the side frame in a manner hereinafter described and connected at their lower ends with the side frame through the medium of a bracket, such as illustrated at 5, secured to arms 6 on said side frame. The side frame 1 may also be provided with lateral arms 7, to which brackets 8 may be secured to receive hangers 8ᵃ for the inside brake shoes 9.

At respective ends, the side frame 1 is made with tapering extensions 10, the free end of each of which are beveled as at 11 and under said extensions, seats are afforded for the journal boxes. The side frame 1 may be made hollow and the bottom member of each extension 10 is made with holes 12, 12, to receive the upper ends of the journal box bolts 4, 4ᵃ and with an intermediate hole 13 for a purpose hereinafter explained.

Hollow tapering brackets 14 are placed on the tapering extensions 10 of the side frame as shown in Fig. 3 and are provided at their free ends with lateral arms 15 with which hangers 16 for the outer brake shoes 17 are connected. Each bracket 14 is provided in its bottom with a hole 18 to receive the journal box bolt 4 and in its top with an opening 19 through which access may be had to a nut or head at the upper end of said bolt. At its inner end, the lower member of the bracket 14 is made with a notch 20 for the accommodation of the journal box bolt 4ᵃ, and the upper member of the side frame is made with an opening 21 through which access may be had to a nut or head at the upper end of said bolt 4ᵃ. The inner end of the bracket 14 is beveled as shown at 22, and the upper member of said bracket is made with an opening 23 which accommodates the top of the extension 10 of the side frame 1. Between the hole 18 and notch 20 in the bottom member of the bracket 14, said bottom member is provided with a lug 24 which enters the hole 13 in the bottom member of the side frame extension 10. One side of the tapering extension 10 lies against one side of the hollow bracket 14 and in order to prevent possibility of lateral displacement of said bracket, the frame extension 10 is made with a lateral enlargement 25 which lies closely against the opposite side wall of the bracket,—said last mentioned wall of the bracket being approximately in line with the inner wall of the side frame 1.

It will be observed that with my improvements the brackets for the outside brake-shoe hangers are made separate from the side frames and secured thereto and that they are secured to the side frame by means of the journal box bolts,—thus obviating necessity for the use of additional bolts or rivets for securing said brackets to the side frame. It will also be observed that the brackets 14 are held in rigid relation to the side frames by the weight of the side frame load which is transmitted to the journal boxes; by the action of the journal box bolts; by the engagement of the lug 24 in the bracket in the hole 13 in the frame extension 10, and by the lateral enlargement 25 on said extension closely fitting the inside wall of the bracket 14.

The invention is applicable for use with both four and six wheel trucks and while I have illustrated this improvement in connection with frames for four wheel truck construction it is not with the intention of limiting its application to such side frames or any other particular construction of side frame.

Slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. The combination with a truck side frame and a journal box, of a brake-shoe hanger bracket mounted on said side frame and provided at its free end with a lateral arm to receive a brake-shoe hanger, and journal box bolts securing said bracket to the side frame.

2. The combination with a truck side frame, of a brake-shoe hanger bracket having interlocking connection with said side frame, a journal box below said bracket, and journal box bolts securing said bracket to said side frame.

3. The combination with a truck side frame having an end extension, said extension having a hole in its bottom, of a brake-shoe hanger bracket receiving said frame extension and having a lug entering the hole in the bottom thereof, and bolts securing said bracket to said frame extension.

4. The combination with a truck side frame having an end extension, of a hollow brake-shoe hanger bracket receiving said extension, said extension having a lateral enlargement lying against a side wall of said hollow bracket, and bolts securing said bracket and frame extension together.

5. The combination with a truck side frame having an end extension, of a hollow brake-shoe hanger bracket receiving said frame extension and having interlocking connection therewith, a bottom journal box bracket secured to the side frame, a journal box between said bottom bracket and the bottom of said first mentioned bracket, and bolts passing through said bottom bracket, the first-mentioned bracket and said side frame extension.

In testimony whereof, I have signed this specification in the presence of two subscribing witnesses.

JOHN C. WHITRIDGE.

Witnesses:
   JACOB C. LARSEN,
   MERRITT R. HANSEN.